United States Patent [19]

Pierquin

[11] Patent Number: 4,521,090
[45] Date of Patent: Jun. 4, 1985

[54] SPECTACLE FRAME WITH REMOVABLE FACE ASSEMBLY

[75] Inventor: Jean-Claude Pierquin, Dompcevrin, France

[73] Assignee: Essilor International (Compagnie Generale d'Optique), Cedex, France

[21] Appl. No.: 398,568

[22] Filed: Jul. 15, 1982

[30] Foreign Application Priority Data

Aug. 11, 1981 [FR] France .................... 81 15512
Apr. 16, 1982 [FR] France .................... 82 06575

[51] Int. Cl.³ .................... G02C 1/04; G02C 5/02; G02C 5/00
[52] U.S. Cl. .................... 351/124; 351/103; 351/41; 351/140; 351/149
[58] Field of Search .................... 351/41, 103, 124, 130, 351/140, 149, 153, 133

[56] References Cited

U.S. PATENT DOCUMENTS

| 2,887,008 | 5/1959 | Gross | 351/140 X |
| 3,040,623 | 6/1962 | Lauber | 351/140 X |
| 3,713,732 | 1/1973 | Gooch | 351/153 |
| 4,402,577 | 9/1983 | Minart | 351/140 X |

Primary Examiner—Rodney B. Bovernick
Attorney, Agent, or Firm—Burgess, Ryan & Wayne

[57] ABSTRACT

A spectacle frame comprising two components which constitute a supporting structure and a face assembly, respectively, mounted removably to each other, wherein one of the components comprises at least one locking element and the other component comprises a recess adapted to receive the at least one locking element being movable between a rest position wherein it allows the components to be separated from each other and an active position wherein the at least one locking element cooperates with the recess when the supporting structure and the face assembly are mounted onto each other, so as to firmly connect the supporting structure to the face assembly.

21 Claims, 22 Drawing Figures

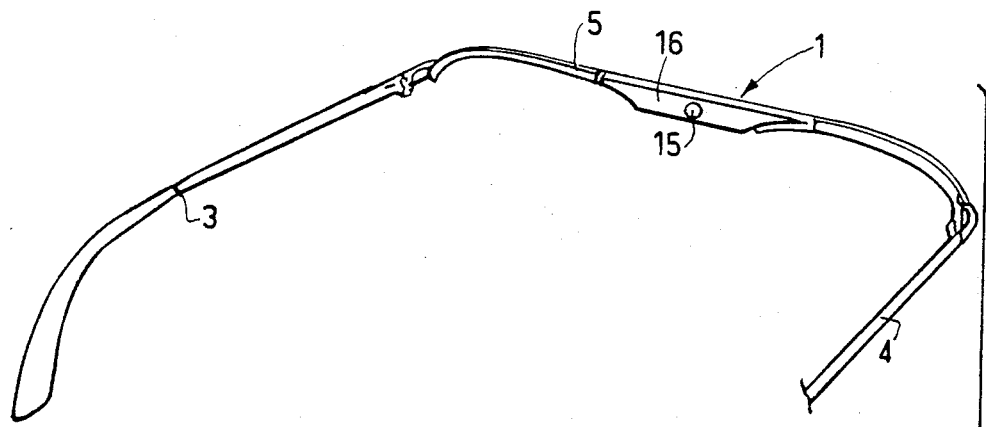
FIG.1
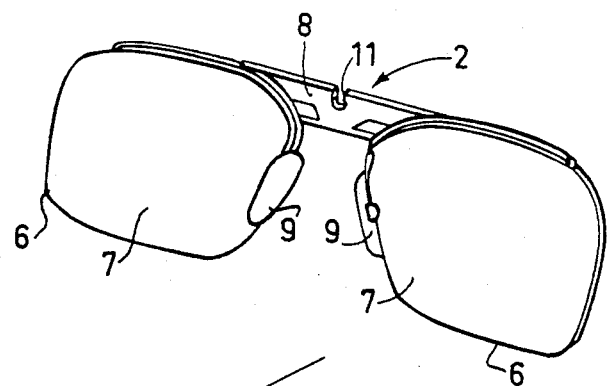
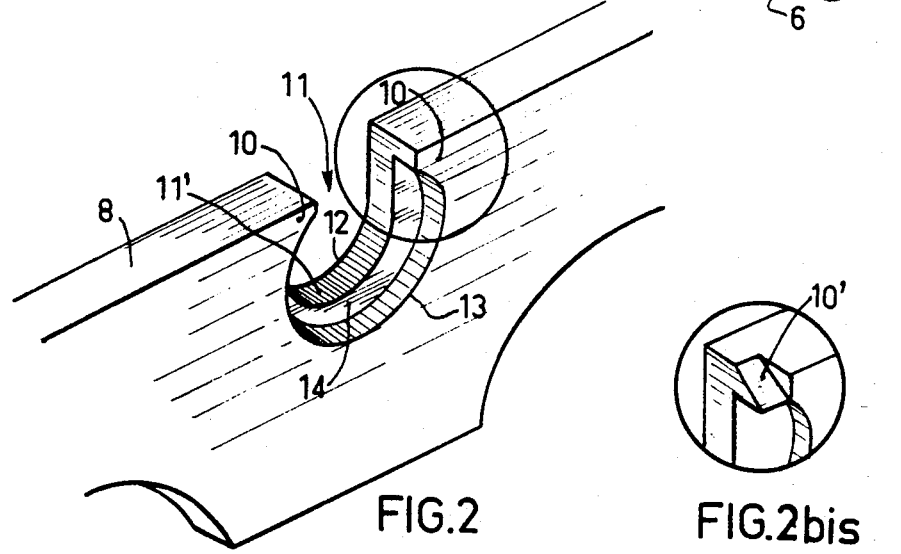
FIG.2
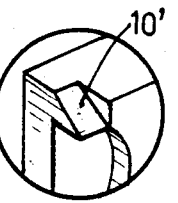
FIG.2bis

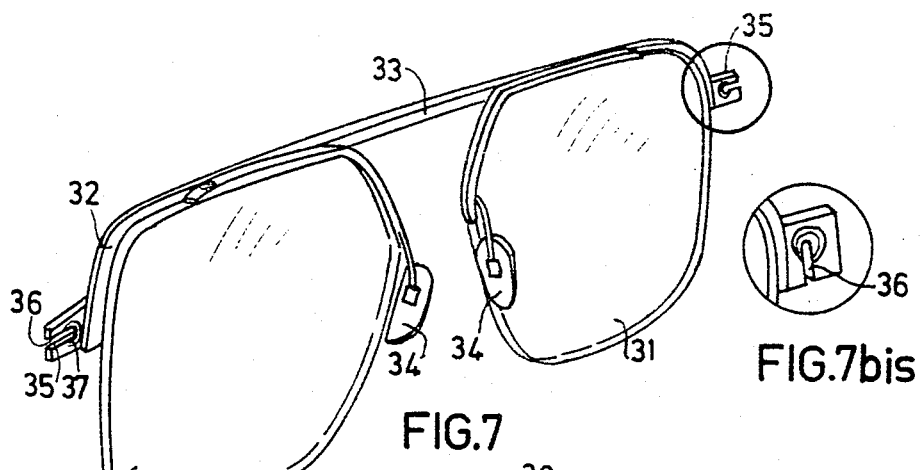
FIG.7    FIG.7bis
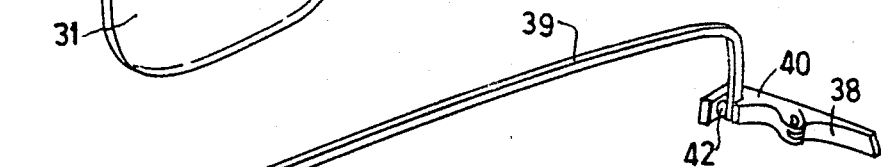
FIG.8
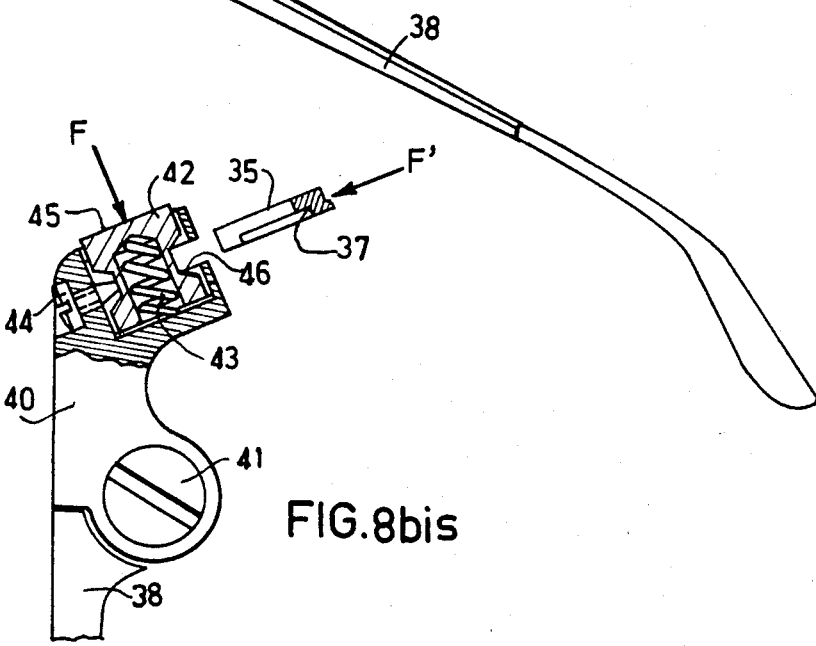
FIG.8bis

SPECTACLE FRAME WITH REMOVABLE FACE ASSEMBLY

FIELD OF THE INVENTION

The present invention relates to a spectacle frame, and more particularly to a spectacle frame comprising a supporting structure and a removable face assembly.

Generally speaking, spectacle frames of this kind are advantageous in that they facilitate the mounting of the ophthalmic glasses or lenses which are to fit such frames, and/or in that they facilitate the replacement of such glasses in accordance with the desires of the user, depending on the conditions of use of the spectacle (for example, near or remote vision, ambient lighting conditions, etc). It is possible, furthermore, when practising the present invention, to store each one or all of the various utilizable face assemblies in a storing space smaller than that required for a complete spectacle frame.

BACKGROUND OF THE INVENTION

French Patent Application No. 80 03 466, filed on Feb. 18, 1980 by the Applicant, describes a spectacle frame comprising a removable face assembly which complies with comfort and aesthetic requirements that had not been met by the comparable prior appliances such as those described in French Patent specification No. 2 094 810 or U.S. Pat. No. 3,713,732.

The spectacle frame to which the above-mentioned Patent specification is directed comprises a removable face assembly including a median bridge piece or saddle constituted by two parallel cross-pieces, and a supporting structure provided with a supporting stud.

With a view to fixing a face assembly, said stud is provided with two parallel grooves adapted each to engage one of the cross-pieces of the face assembly.

This prior spectacle frame substantially complies with all of the requirements set forth herein-above. However, due to the mounting of the face assembly by engaging the grooved stud of the supporting structure this known arrangement involves the risk of accidental separation of said structure and said face assembly by involuntary tearing-off.

It is an object of the present invention to provide a spectacle frame with a removable face assembly, which overcomes the afore-mentioned drawbacks.

The instant invention is aimed at providing a spectacle frame of the type described herein-above, which allows the supporting structure and the face assembly to be assembled without any clearance, and which has aesthetically pleasing characteristics.

BRIEF DEFINITION OF THE INVENTION

These objects are achieved, according to the invention, by a spectacle frame comprising a combination of two separable parts one of which is a supporting structure, while the other one of said parts is a removable face assembly. One of said parts comprises a locking element and the other part comprises a recess for said locking element. The locking element is movable between a rest position wherein the abovementioned two parts can be separated, and an active position wherein it cooperates with said recess for interlocking said parts when said supporting structure and said face assembly are assembled to each other.

A spring is provided for biasing the locking element toward its active position. Said element will not leave said position unless it is voluntarily pressed towards its rest position, against the force of said spring. Thus any accidental separation of the supporting structure and the face assembly is efficiently avoided.

The invention will be described in more detail hereinbelow, particularly with reference to the appended drawing which is given by way of illustration, but not of limitation, and wherein:

BRIEF DESCRIPTION OF THE DRAWING

FIG. 1 is a perspective view showing separately the supporting structure and the face assembly of a spectacle frame according to the invention;

FIG. 2 is a perspective view of the recess which cooperates with the locking element of the spectacle frame according to the invention;

FIG. 2 bis shows a detail of a modified embodiment of the recess according to FIG. 2;

FIG. 7 is a perspective view showing a face assembly of a spectacle frame according to a second embodiment of the invention;

FIG. 7 bis shows a variant of a detail of the face assembly according to FIG. 7;

FIG. 8 is a perspective view of the supporting structure associated with the face assembly of FIG. 7;

FIG. 8 bis is a sectional view showing a detail of the supporting structure of FIG. 8, the section being taken along line 2—2 of FIG. 8;

DETAILED DESCRIPTION OF PREFERRED EMBODIMENT OF THE INVENTION

Figure 3:
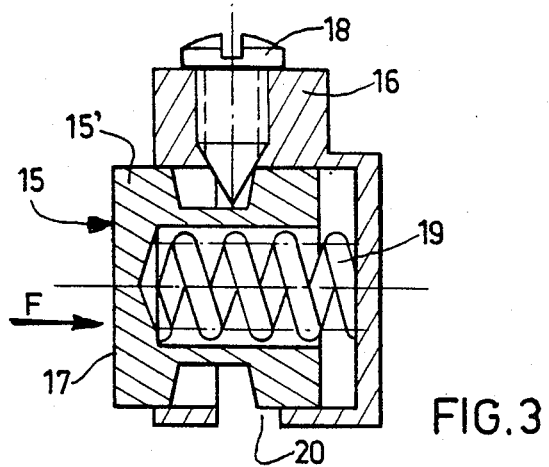
FIG. 3 is an axial section of the locking element of the spectacle frame according to the invention.

The two components of the spectacle frame according to the invention are shown separately in FIG. 1, said components comprising respectively, by a supporting structure 1 and a face assembly 2. In a manner known per se, the supporting structure comprises two side members, or arms 3, 4 hinged to a central member 5. Face assembly 2 comprises two hoops 6 adapted each to receive a lens 7; hoops 6 are connected to each other by a bridge piece or saddle 8 which bears nose rest plates 9. The upper edge of saddle 8 defines a central recess 11 formed by a notch 11' shown in detail in FIG. 2.

As shown in this Figure, said notch 11' opens at one side of the saddle while forming a U-shaped profile 12 and, on the other side of the saddle, opens along a partially circular profile 13 the diameter of which is greater than the distance between the branches of the U-shaped profile. Thus a shoulder 14 is provided between profiles 12 and 13.

This shoulder 14 is shaped in such a manner that it acts as a stop for a locking element 15 provided on the median portion of supporting structure 1.

The central part 16 of said median portion has a U-shaped cross-section complementary to that of saddle 8. Thus it is possible to introduce slidingly said saddle between the flanges of said central part, said flanges supporting locking element 15 in a position which corresponds to that of notch 11' provided on saddle 8.

FIG. 3 is a detailed view of element 15. Said element comprising a teat 15' movable in a transverse direction on central part 16 of the median portion of the supporting structure. Teat 15' has an end 17 comprising a key accessible from the outside of part 16. The two ends of teat 15' have a transverse dimension greater than that of notch 11' of saddle 8. A stop screw 18 cooperates with the right end of teat 15' for limiting the stroke length of the displacements thereof. A spring 19 is placed in a central bore provided within the teat, between the bottom of said bore and a flange of central part 16 of the supporting structure. Said spring biases the teat toward the left side, as shown in FIG. 3.

A slot 20 is formed on the lower edge of central part 16 of the supporting structure. The width of said slot is so selected that it allows saddle 8 of face assembly 2 to be introduced.

Figure 4:
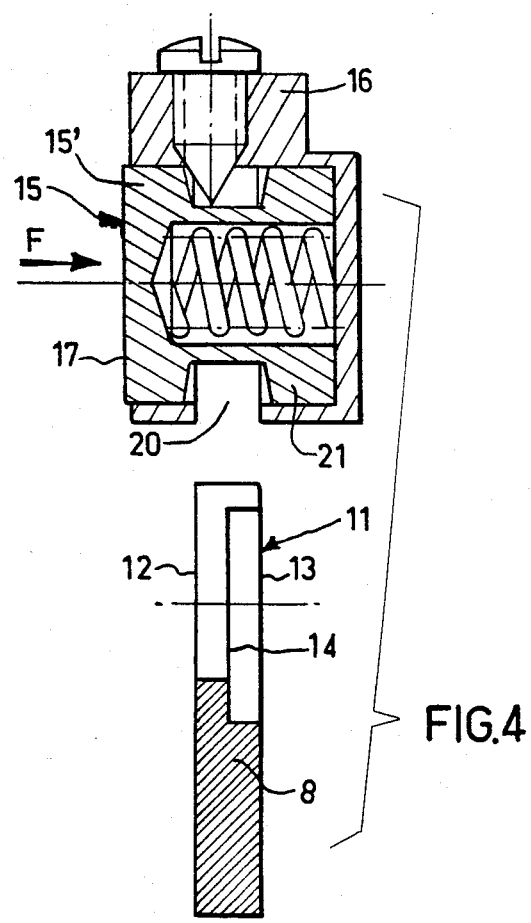
FIG. 4 shows the locking element of FIG. 3 in the position where it is adapted to receive the saddle of the face assembly incorporated in the spectacle frame according to the invention.
Figure 5:
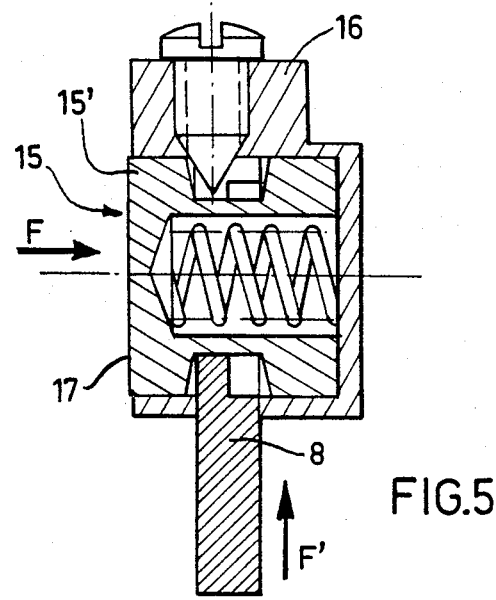
FIG. 5 shows the saddle of the face assembly, as mounted onto the locking element in the position represented in FIG. 4.
Figure 6:
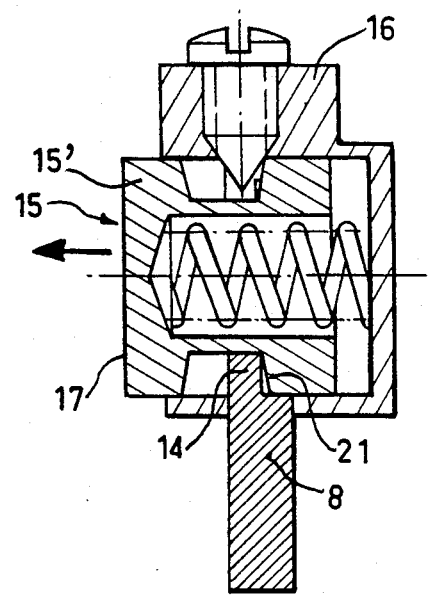
FIG. 6 shows the locking element and the recess of the saddle in the locking position.

FIGS. 4 to 6 illustrate the various steps of assembling the supporting structure to the face assembly according to the invention.

With a view to assembling these parts, teat 15' is pressed toward the right side (cf. FIG. 4) by exerting a pressure on key 17 in the direction indicated by arrow F. Practically, central part 16 of the supporting structure is pinched by two fingers of an operator's hand. The end of teat 15' is then received in central part 16 and disengages slot 20.

The operator, while holding face assembly 2 with his other hand, introduces saddle 8 into slot 20 in the direction of arrow F' without encountering any obstacle, due to the retracted position of the end 21 of teat 15' (cf. 5).

The operator then releases the pressure exerted on key 17 so that spring 19 pushes teat 15' toward the left side (FIG. 6) into an active position wherein its end 21 engages shoulder 14 of the notch of saddle 8 of the face assembly, whereby the latter and the supporting structure of the spectacle frame according to the invention are fixedly connected to each other. The diameter of the end 21 of the teat is so selected that the latter is prevented from leaving the notch 11' of the saddle, the width of which is smaller than said diameter.

Central part 16 of the supporting structure has a profile complementary to that of saddle 8 of face assembly 2. This feature of complementary profile ensures the guiding and centering of the saddle in said supporting structure. Central part 16 defines an internal groove for saddle 8 which it encompasses perfectly, with a minimum clearance.

Teat 15' is placed within said central part. Thus it is hidden, which is advantageous for the aesthetical aspect of the spectacle frame.

When it is desired to dismount the face assembly from the supporting structure—e.g. in order to store said face assembly or to replace the same by another face assembly corresponding to different observation conditions (near or remote vision, tinted glasses for a highly luminous environment, and so forth)—teat 15' is pressed by pinching with one hand the central part of the supporting structure, and the saddle of the central part of said structure is removed by the other hand.

In another embodiment shown in FIG. 2 bis, a ramp 10' is provided adjacent to each end 10 of the circular contour 13 of notch 11. Due to these ramps it is not necessary to exert a pressure on teat 15' for mounting face assembly 2 to supporting structure 1. The user only pushes the saddle of the face assembly into central part 16. The teat then engages ramps 10' which push it temporarily toward the right side (as shown in FIG. 3). The teat then enters its receiving recess so as to integrally connect the supporting structure to the face assembly. With a view to removing the face assembly it is of course necessary to exert a pressure on teat 15' which comprises the locking element 15.

In the embodiments described herein-after, the spectacle frame comprises two symmetrical connecting assemblies placed on the frame, each one of said assemblies comprising a locking element and a mounting recess in the vicinity of a junction between the face assembly and each one of the two side pieces of the supporting structure.

Due to said two connecting assemblies, the construction formed by the face assembly and the supporting structure is reinforced. Furthermore, the aesthetical aspect of the saddle connecting the glasses of the face assembly is improved due to the elimination of any connecting assembly.

FIG. 7 shows a second embodiment of the face assembly according to the present invention. This assembly comprises two glasses or lenses 31 supported by a bow piece 32 which defines a saddle 33 between said glasses. Nasal bearing plates 34 are also provided, in a manner known per se.

Each one of the ends of bow piece 32 is provided with an ear piece 35. Said ear piece comprises a U-shaped notch 36. The face of the ear piece, which is shown in FIG. 7, furthermore is provided with a circular recess 37 the depth of which is greater than the width of notch 36, which also applies to the notch similar to that shown in FIG. 2.

FIG. 8 shows the supporting structure associated to the face assembly of FIG. 7. This structure comprises two hinged arms 38, a bow piece 39 complementary to bow piece 32 of the face assembly, and two connecting elements 40 interposed between the ends of bow piece 39 and arms 38.

FIG. 8 bis is a sectional view of one of connecting pieces 40. A screw 41 serves to hinge arms 38 to piece 40. The end of this piece, which is opposed to that end of the piece where the hinged connection is formed, is shaped so as to receive complementarily a locking element such as a teat 42 provided with a bore containing a spring 43 that biases the teat in a direction opposed to that of arrow F. A locking screw 44 one of which cooperates with a median groove of the teat limits the stroke length of the latter. By means of this screw it is possible to mount spring 43 in a strongly pre-stressed position while the teat is prevented from escaping.

For mounting the face assembly onto the supporting structure, ear pieces 35 are inserted about the associated teats, taking benefit of the elasticity of bow piece 32 which may be inclined slightly at the level of the saddle. A pressure must then be exerted in the direction of arrow F on the key 45 of teat 42. FIG. 8 bis shows teat 42 in the position it takes while said pressure is applied to its key. When ear piece 35 is inserted in the direction indicated by arrow F′, the operator stops to apply the manual pressure on the teat, a portion 46 of which engages circular recess 37 of the ear piece so as to lock the same. This arrangement corresponds to that described and shown with reference to FIGS. 2 to 6.

In this second embodiment of the invention the spectacle frame comprises two connecting assemblies mounted to the two ends of the bow pieces which connect, on the one hand, the connecting elements 40, and, on the other hand, the ear pieces 35. Thus the mounting of the face assembly and the supporting structure is reinforced. The saddle, which is not associated to any connecting assembly is thus enabled to preserve its simple, conventional design, whereby the aesthetic aspect of the spectacle frame is improved.

FIG. 7 bis shows a variant of the ear piece 35 surrounded by a circle in FIG. 7. In this variant notch 36 is oriented vertically. It is thus possible to mount the face assembly onto the supporting structure without plying or folding it in the zone of the saddle. In this embodiment, locking screw 44 must of course be displaced. Such modified embodiment does not raise any problem, as to its material realization, for those skilled in the art.

Figure 9:
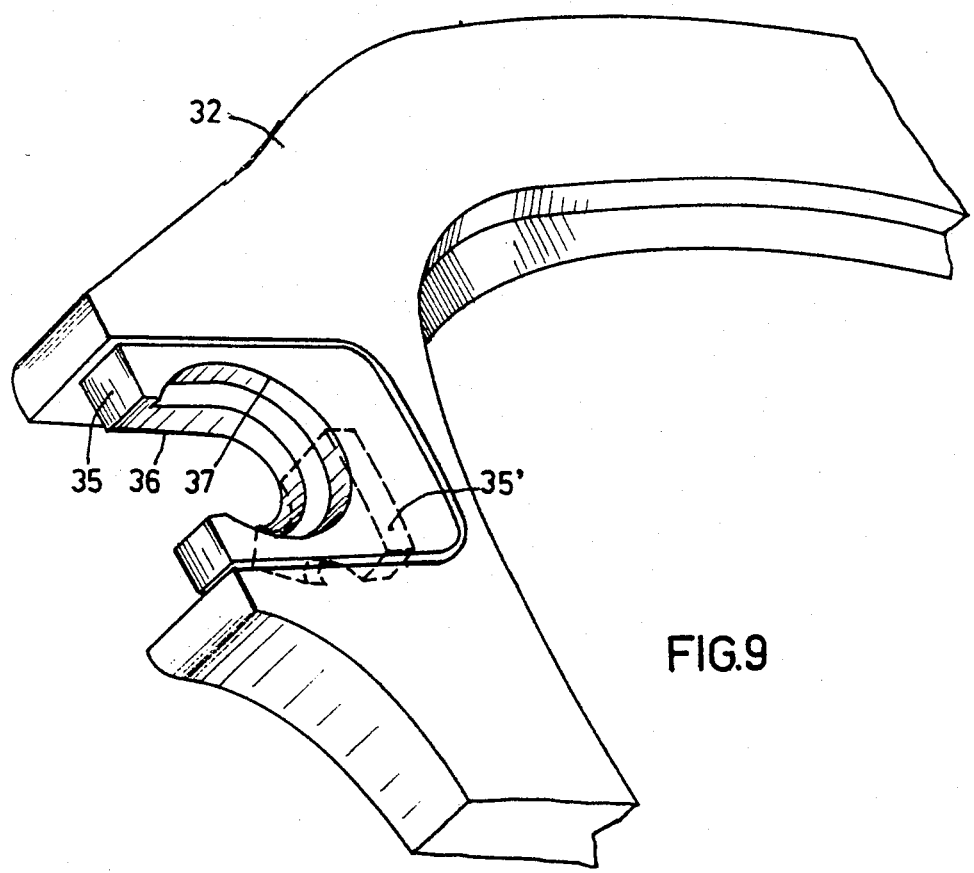
FIGS. 9 to 13 show details of variants of the embodiment represented in FIG. 7.
Figure 10:
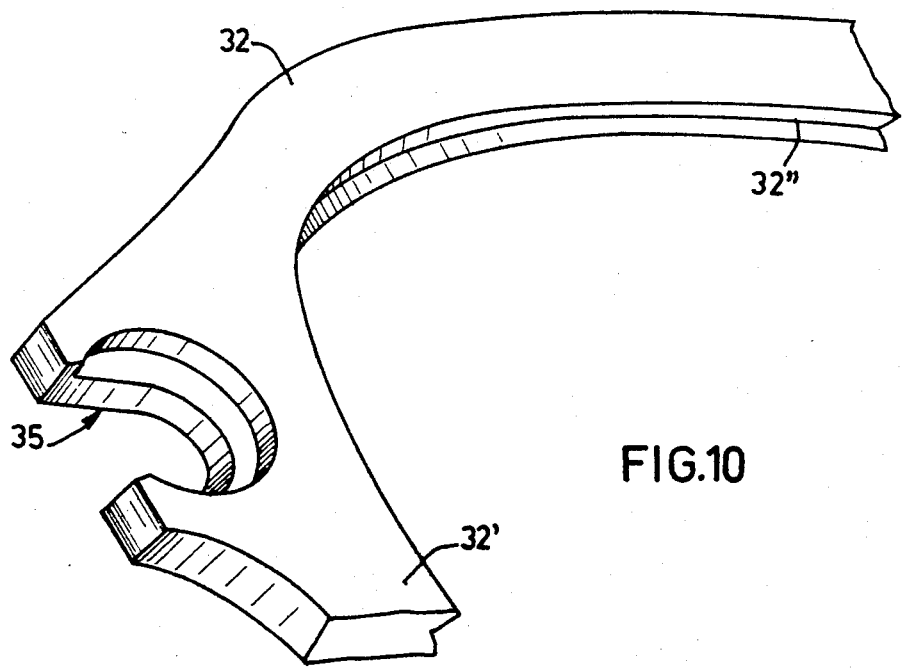
Figure 11:
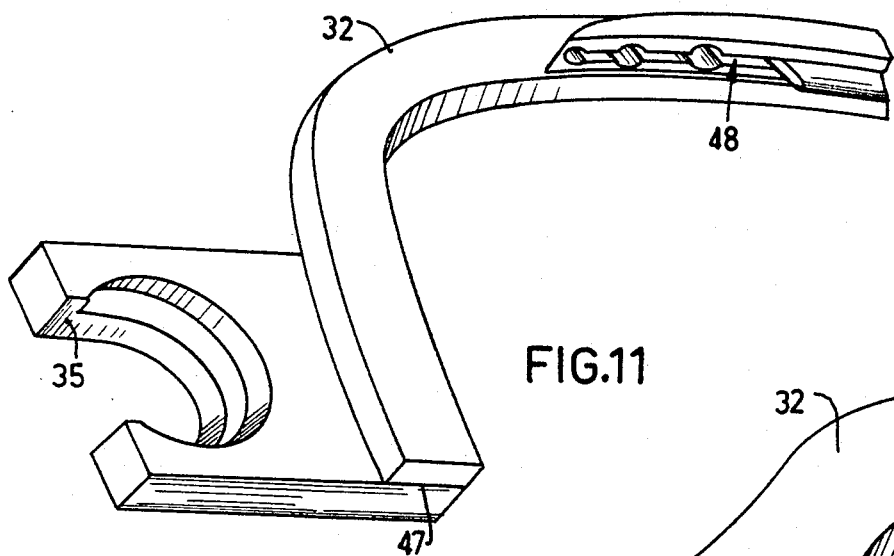
Figure 12:
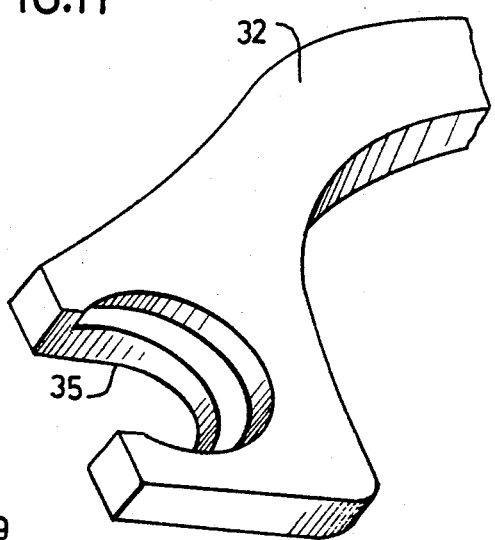
Figure 13:
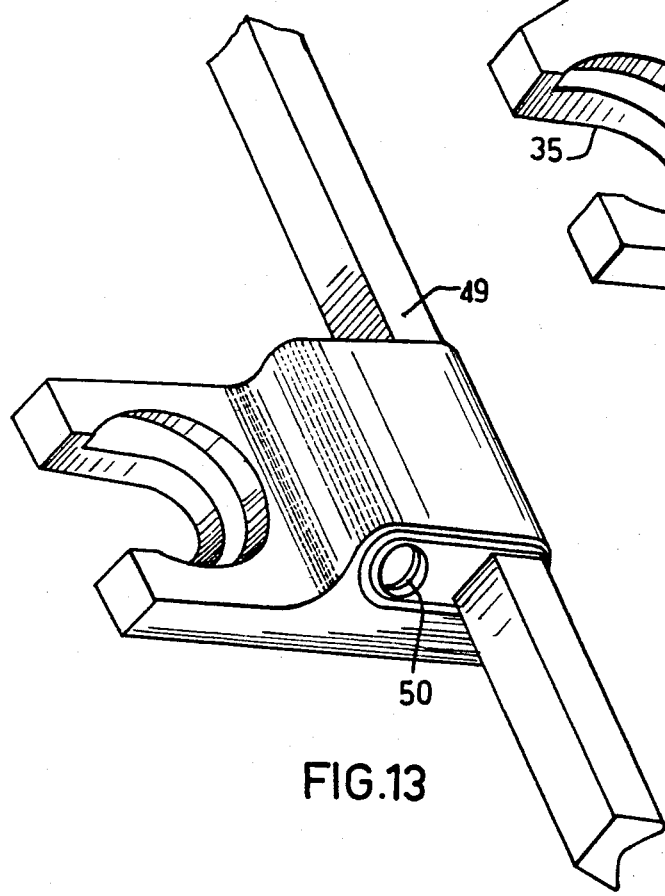

FIGS. 9 to 13 show modified embodiments of the ear pieces of the assembly according to FIG. 7. Ear piece 35 of FIG. 9 is formed by a metallic element, or "insert", the foot portion 35′ of which is embedded in the mass of bow piece 32, which latter is made, e.g. of plastic material. FIG. 10 shows an ear piece 35 integral with bow piece 32 and hoop 32′ made, for example, of a metallic material, and maintaining a spectacle lens by means of a V-shaped groove 32″. FIG. 11 shows an ear piece 35 welded at 47 onto the bow piece 32. This Figure shows schematically, at 48, means known per se which allow spectacle lenses to be hooper and maintained by a thread of plastic material, such as Nylon. The embodiment shown in FIG. 12 is similar to the preceding one, however, here the ear piece 35 is integral with the bow piece 32. The ear piece shown in FIG. 13 is removably mounted to hoop 49 of the spectacle frame. It is fixed thereto by means of a clamping device known per se (not shown in the Figure) which is actuated by a screw 50.

Figure 14:
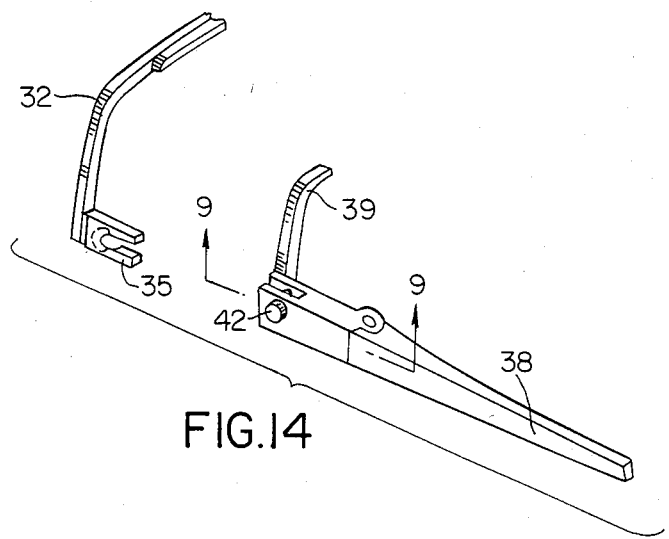
FIG. 14 shows a detail of the face assembly and the supporting structure according to a third embodiment of the present invention.

FIG. 14 represents a detail of another embodiment of the spectacle frame according to the invention. The face assembly and supporting structure are shown in a pre-assembled condition. Ear piece 35 projects perpendicularly from the plane of the face assembly. Due to this arrangement, ear piece 35 can be engaged on locking teat 42 without the help of the elasticity of the spectacle frame, contrarily to the embodiment shown in FIGS. 7 and 8.

Figure 15:
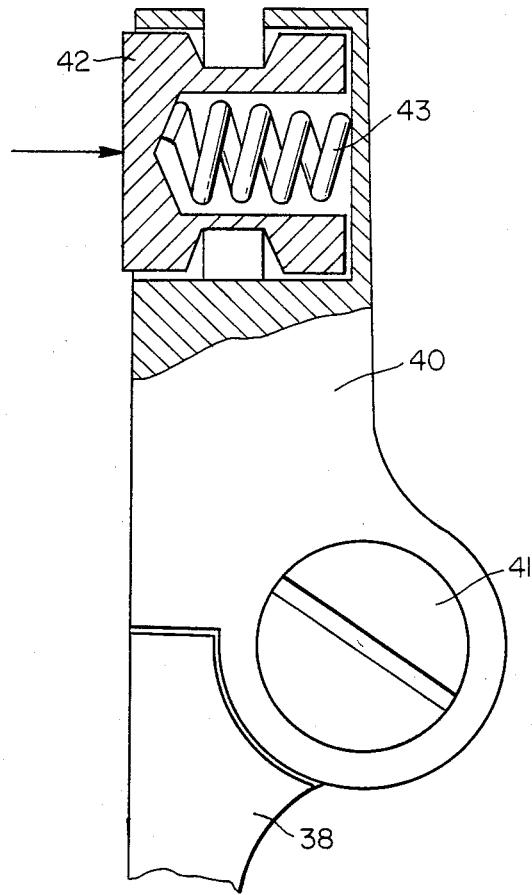
FIG. 15 is a sectional view of a detail of the supporting structure shown in FIG. 14, the section being taken along line 9—9 of FIG. 14.

FIG. 15 is a sectional view taken along line 9—9 of FIG. 14, showing the connecting element 40. With the exception of the different orientation of teat 42, the assembling of the ear piece and the teat is effected as described herein-before with reference to FIG. 8 bis.

Figure 16:
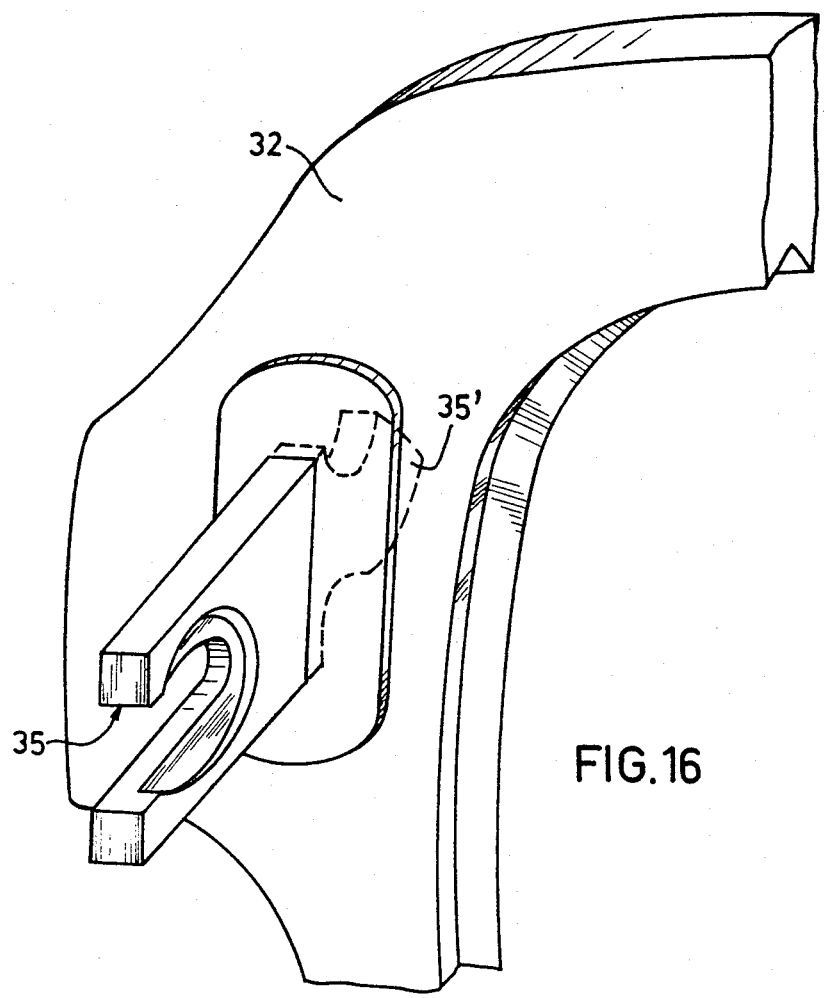
FIGS. 16 and 17 represent details of variants of the embodiment represented in FIG. 14.

FIG. 16 shows a variant of the ear piece according to the embodiment represented in FIG. 14. This ear piece is constituted by a metallic insert the foot portion 35′ of which is embedded in the mass of the plastic material forming the bow piece 32 of the face assembly of the spectacle frame. In another modification, shown in FIG. 17, the ear piece is provided at its free end with two ramps 51 adapted to facilitate the insertion of the ear piece around the locking teat. It should be noted that such ramps may be provided in every embodiment of the ear pieces incorporated in the spectacle frame according to the invention. When a face assembly is mounted onto an associated supporting structure such ramps push back temporarily the teat against the action of spring 43, thus rendering superfluous the exertion of a pressure on the key of teat 42.

Figure 18:
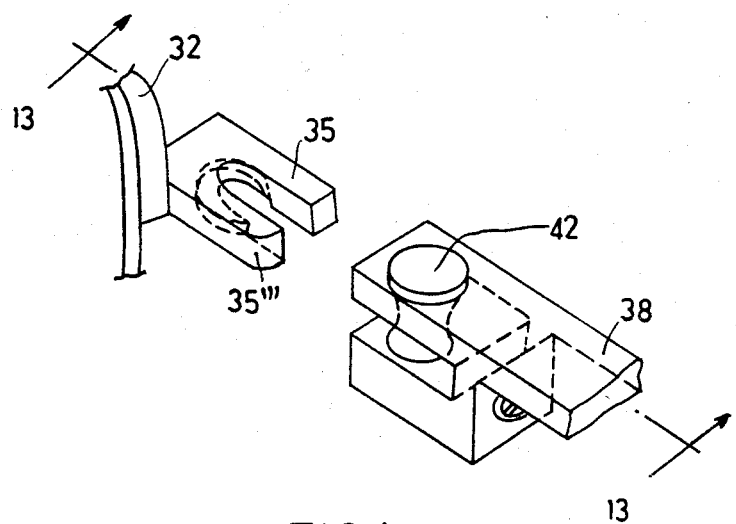
FIG. 18 is a detailed view of a fourth embodiment of a face assembly and supporting structure forming a spectacle frame according to the invention.

FIG. 18 is similar to FIG. 14 and shows yet another embodiment of the spectacle frame according to the invention. Locking teat 42 also constitutes a hinging element for the related spectacle arm, thus replacing the screw provided in the embodiments shown in FIGS. 8 bis and 15. To this end piece 35 is fixed onto bow piece 32 of the face assembly in a horizontal position position (with reference to FIG. 18). Teat 42 is mounted to the corresponding end of arm 38, in such a manner that its axis is substantially vertical. The end of this side arm is substantially U-shaped and thus has a form complementary to that of ear piece 35 adapted to receive the latter with minimum clearance.

Figure 19:
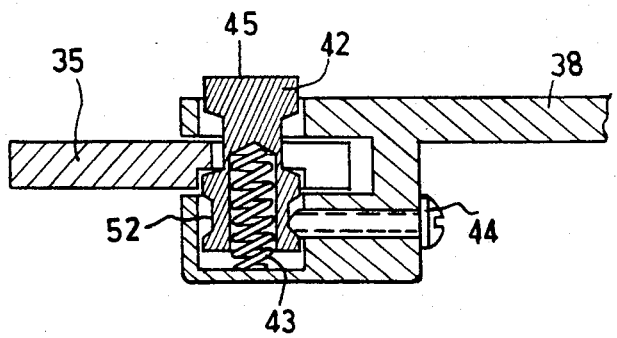
FIG. 19 is a sectional view taken along 13—13 of FIG. 18, showing parts of the supporting structure and the face assembly of the fourth embodiment of the invention, in a position wherein they cooperate with each other.

The section view of FIG. 19 shows the face assembly as mounted on a arm according to FIG. 18.

It will be seen that in this Figure teat 42 is retained on the end of arm 38 by a locking screw 44 the point of which engages a groove 52 provided on teat 42, below a first groove allowing ear piece 35 to encircle the teat. Due to said locking screw 44 spring 43 is enabled to apply a pre-stress to teat 42 with a view to consolidating the assembly constituted by the ear piece and the teat.

When mounting the spectacle frame according to the invention, each ear piece of the face assembly is inserted into the end of the corresponding spectacle frame arm while a manual pressure is applied onto key 45 of teat 42. This pressure is then discontinued, and the teat raises so as to lock the ear piece on the end of the arm.

Thus the arm and the face assembly are firmly interlocked. Possibly, by means of a rounded portion 35″, provided on the free end of ear piece 35 the arm 38 is enabled to rotate toward the inside of the spectacle frame, about the axis of the teat.

Figure 17:
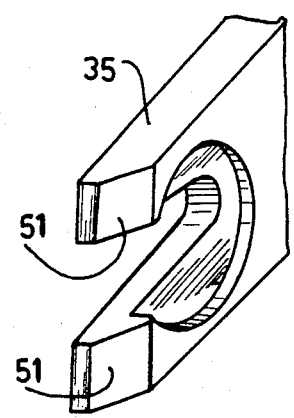

In a modified embodiment ear piece 35 may be bevelled, as shown in FIG. 17, for the purpose explained in the description of said Figure.

It should be pointed out that bow piece 39 of the supporting structure (cf. FIG. 8 or 14) may be omitted, whereby the spectacle frame is then formed by a face assembly and two removable arms, the face assembly being adapted to be replaced by other face assemblies having different characteristics.

When using such arrangement, wherein the supporting structure comprises two separate arms it is possible, on the one hand, to use rigid, non-hinged side pieces and, on the other hand, to form various combinations of arms and associated face assemblies. When one of the arms is accidentally broken, or lost, the user can then change or repair it himself, or herself, and it is also possible with this embodiment, to adapt the spectacles to any particular conditions by conveniently combining selected face assemblies and arms.

Furthermore, the positions or locations of the teat and associated ear piece may be reversed on the face assembly and the supporting structure, for aesthetical reasons, and the connecting assembly 35, 36, 40, 42 may serve to connect rigidly the bow piece 32 of the face assembly to the corresponding arm 38.

The invention is not limited to the embodiments shown and described herein-above; many modifications and variants may be envisaged by those skilled in the art without departing from the spirit and scope of the invention as defined in the appended claims.

What is claimed is:

1. A spectacle frame comprising:
   two components which constitute a supporting structure and a face assembly, respectively, mounted removably to each other, one of said components comprising at least one locking means and the other component comprising a recess adapted to receive said at least one locking means, said at least one locking means being movable between a rest position wherein it allows said two components to be separated from each other and an active position wherein said at least one locking means cooperates with said recess when said supporting structure and said face assembly are mounted onto each other, so as to firmly connect said supporting structure to said face assembly; and
   a spring biasing said at least one locking means toward its active position; and
   said at least one locking means is constituted by a teat having a key accessible from the outside of the frame, the arrangement being such that a pressure exerted on said key causes said teat to move toward its rest position against the action of the spring.

2. A spectacle frame according to claim 1, further comprising at least one ramp arranged with respect to said recess in such a manner that the at least one locking means is moved toward its rest position when the supporting structure is approached to the face assembly for assembling said structure and assembly, whereafter said at least one locking means projects from said ramp so as to move again toward its active position under the action of said spring, for firmly connecting said two components of the spectacle frame to each other.

3. A spectacle frame according to claim 1, wherein said at least one locking means is mounted on a central part of the supporting structure, while said recess is defined in a saddle which is part of said face assembly, said central part and said saddle being arranged in respective locations in such a manner that they correspond to each other when said two components of the spectacle frame are mounted to each other.

4. A spectacle frame according to claim 3, wherein said central part of the supporting structure has a U-shaped cross-section complementary to the shape and thickness of the saddle of said face assembly, so as to receive, guide and center said saddle when the same is inserted into said central part for assembling the two components of said frame.

5. A spectacle frame according to claim 4, wherein said recess comprises a notch opening at an edge of said saddle, said notch opening into one face of the saddle in accordance with a U-shaped profile, and into the other face of said saddle in accordance with a partially circular profile having a diameter greater than the width of the U-shaped profile, while a shoulder is defined between said two profiles and adapted to constitute a stop for said at least one locking means when the latter penetrates said recess for firmly connecting said two components of the frame to each other.

6. A spectacle frame according to claim 5, wherein ramps are formed in the vicinity of the two ends of the circular portion of the said partially circular profile of said recess.

7. A spectacle frame according to claim 1, wherein said at least one locking means is mounted on a saddle which forms part of the face assembly, while said recess is formed in said supporting structure at a location corresponding to that of the at least one locking means when said two components of the frame are assembled.

8. A spectacle frame comprising:
   two components which constitute a supporting structure having two arms and a face assembly, respectively, mounted removably to each other, and
   two symmetrical connecting assemblies, each including a locking element and
   a recess adapted to receive said locking element, said locking element being movable between a rest position wherein it allows said two components to be separated from each other and an active position wherein said locking element cooperates with said recess when said supporting structure and said face assembly are mounted onto each other, so as to firmly connect said supporting structure to said face assembly, each one of said assemblies being located in the vicinity of the junction between the face assembly and one of the arms of the supporting structure, and said locking element includes by a teat which is biased toward an active position by a pre-stressed spring.

9. A spectacle frame according to claim 8, wherein the recess of each connecting assembly is formed on an ear piece integral with said face assembly.

10. A spectacle frame according to claim 9, wherein each ear piece projects from said face assembly while extending in the plane of the latter.

11. A spectacle frame according to claim 9, wherein each ear piece projects from said face assembly perpendicularly to the plane of the latter.

12. A spectacle frame according to claim 9, wherein each ear piece is constituted by a supporting element adapted to support spectacle lenses of the face assembly.

13. A spectacle frame according to claim 9, wherein each ear piece is constituted by a metallic piece at least partially embedded in the mass of one lens supporting element of said face assembly.

14. A spectacle frame according to claim 9, wherein each ear piece is welded to a lens supporting element of said face assembly.

15. A spectacle frame according to claim 9, wherein each ear piece is fixed to a lens supporting element of said face assembly by means of a clamping device comprising at least one screw.

16. A spectacle frame according to claim 9 wherein each ear piece has a free end provided with at least one ramp.

17. A spectacle frame according to claim 8, wherein each locking element is held by a connecting element to which the arms of said supporting structure are hingedly connected.

18. A spectacle frame according to claim 17, wherein said supporting structure comprises a bow piece, said connecting element being fixed to the respective ends of said bow piece.

19. A spectacle frame according to claim 8, wherein said supporting structure comprises two removable arms directly fixed to said face assembly by means of a connecting element.

20. A spectacle frame according to claim 8, wherein a locking screw limits the length of the stroke of said teat when the latter is displaced under the action of said spring.

21. A spectacle frame according to claim 8, wherein each connecting assembly includes a hinge connection between any one of said arms and said supporting structure.

* * * * *